Patented Feb. 9, 1926.

1,572,248

UNITED STATES PATENT OFFICE.

SAMUEL E. SHEPPARD AND LEON W. EBERLIN, OF ROCHESTER, NEW YORK, ASSIGNORS TO EASTMAN KODAK COMPANY, OF ROCHESTER, NEW YORK, A CORPORATION OF NEW YORK.

PROCESS OF REDUCING THE VISCOSITY CHARACTERISTICS OF NITROCELLULOSE.

No Drawing. Application filed June 15, 1925. Serial No. 37,404.

*To all whom it may concern:*

Be it known that we, SAMUEL E. SHEPPARD and LEON W. EBERLIN, a subject of the King of Great Britain, and a citizen of the United States of America, respectively, residing at Rochester, in the county of Monroe and State of New York, have invented certain new and useful Improvements in Processes of Reducing the Viscosity Characteristics of Nitrocellulose, of which the following is a full, clear, and exact specification.

This invention relates to processes for reducing the viscosity characteristics of nitrocellulosic materials. One object of the invention is to provide a safe, simple and relatively inexpensive process for treating such materials in order to lessen the viscosity characteristics. Another object of the invention is to provide a process in which the treating material may be separated from the treating fluid with the maximum facility. Another object is to provide such a process which may be carried out at room temperature and atmospheric pressure. Other objects will hereinafter appear.

In certain industries there are employed solutions of nitrocellulose which are sprayed or readily flowed and are yet highly concentrated,—that is, they have a low viscosity and a high percentage of nitrocellulose. Many kinds of nitrocellulose, as ordinarily manufactured and used, cannot be dissolved to form such solutions. It is, therefore, desirable to provide a process for converting the high viscosity types of nitrocellulose, whether in the form of the original nitrated fibers, or in the form of waste or scrap material, into nitrocelluloses having low viscosity characteristics. Such a process should preferably avoid any unnecessary operations, such as needless heating or precipitating steps.

We have found that a process having these desirable effects may be carried out by treating nitrocellulosic material with gaseous nitrogen peroxide. The material, placed in the gas, is allowed to remain until the desired degree of viscosity lowering has been reached, as indicated by the usual tests. The nitrogen peroxide can be mixed with other gases, such as air. The process is, moreover, rapid and useful when carried out at room temperature and atmospheric pressure, thus avoiding the expense of pressure vessels and the cost and trouble of heating operations. The process moreover, allows the utilization of waste oxides of nitrogen, such as those recovered in connection with a plant in which cellulose is nitrated. Mixed monoxide and dioxide may be used.

The process is applicable to original nitrated cellulose fibers, or to colloidized nitrocellulose, preferably in the solid form, such as pyroxylin waste or film scrap, associated with softeners or conditioning agents like camphor, butyl alcohol and so forth. Where film scrap is treated, gelatinous layers are preferably removed before our treatment.

The duration of the treatment depends upon various factors, such as the concentration of nitrogen peroxide, the temperature, the condition of the nitrocellulose material and so forth. Where lower concentrations of nitrogen oxides are used the action is prolonged. Moderate heating during the process hastens the action; but the viscosity is reduced with sufficient rapidity for ordinary purposes at room temperature.

We shall now describe by way of illustration examples of our invention, but it will be understood that the latter is not limited to the details of these examples, except as indicated in the appended claims. Nitrocellulosic material, such as pyroxylin waste or photographic film scrap, from which gelatinous material has preferably been removed, is placed, while in comminuted condition in a room or vessel containing pure or highly concentrated nitrogen peroxide. It is kept in contact with the gas, at room temperature, until the viscosity characteristics are found, upon test, to be properly lowered. Often this result is obtained in as short a time as three hours. Of course, the material may be agitated in the atmosphere of nitrogen peroxide in order to facilitate the uniform action of the latter throughout the mass of material. Such an atmosphere of pure or highly concentrated nitrogen peroxide is substantially without nitrating effect upon cellulose or nitrocellulose.

After the action has proceeded to the desired point, the solid nitrocellulose is simply removed from the atmosphere of nitrogen peroxide, and then given a thorough washing until it meets the desired test for acidity-removal.

Instead of a highly concentrated atmosphere of the higher oxides of nitrogen, we may substitute in the above example a mixture of equal volumes of nitrogen peroxide and air. In this case an action of eight hours at room temperature is usually adequate, although it can be prolonged beyond that time.

Having thus described our invention, what we claim as new and desire to secure by Letters Patent is:

1. The process of treating nitrocellulose which comprises acting thereon with a substantially non-nitrating gaseous mixture containing higher oxides of nitrogen until its viscosity characteristics are lowered.

2. The process of treating nitrocellulose which comprises keeping the latter in a substantially non-nitrating atmosphere containing nitrogen peroxide until the viscosity characteristics of the nitrocellulose are reduced.

3. The process of treating nitrocellulose which comprises keeping it in contact with a gaseous mixture containing higher oxides of nitrogen at room temperature until the viscosity characteristics of the nitrocellulose are lowered.

4. The process of treating solid colloidized nitrocellulose, which comprises keeping the same in a substantially non-nitrating atmosphere containing higher oxides of nitrogen, until the viscosity characteristics of said colloidized nitrocellulose are reduced.

5. The process of treating solid colloidized nitrocellulose associated with a high boiling organic compound, which comprises keeping said nitrocellulose, while in a condition having a large surface relative to its mass, in an atmosphere containing nitrogen peroxide at room temperature until the viscosity characteristics of the nitrocellulose are reduced.

Signed at Rochester, New York, this 11th day of June, 1925.

SAMUEL E. SHEPPARD.
LEON W. EBERLIN.